(12) United States Patent
Naruke et al.

(10) Patent No.: US 11,424,494 B2
(45) Date of Patent: Aug. 23, 2022

(54) ONBOARD-BATTERY TEMPERATURE CONTROLLER

(71) Applicant: SUBARU CORPORATION, Tokyo (JP)

(72) Inventors: Toshiaki Naruke, Tokyo (JP); Hatsuhisa Ueda, Tokyo (JP); Norio Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 92 days.

(21) Appl. No.: 16/750,940

(22) Filed: Jan. 23, 2020

(65) Prior Publication Data

US 2020/0313257 A1 Oct. 1, 2020

(30) Foreign Application Priority Data

Mar. 28, 2019 (JP) .............................. JP2019-063652

(51) Int. Cl.
*H01M 10/633* (2014.01)
*H01M 10/625* (2014.01)
(Continued)

(52) U.S. Cl.
CPC ........... *H01M 10/633* (2015.04); *B60L 58/26* (2019.02); *B60L 58/27* (2019.02); *H01M 10/613* (2015.04);
(Continued)

(58) Field of Classification Search
CPC ...... B60L 58/26; B60L 58/27; H01M 10/613; H01M 10/615; H01M 10/625; H01M 10/63; H01M 10/633; H01M 10/635; H01M 10/6554; H01M 10/6556; H01M 10/656; H01M 10/6561; H01M 10/6567; H01M 10/6571; H01M 10/663; H01M 2220/20; H01M 50/20

See application file for complete search history.

(56) References Cited

U.S. PATENT DOCUMENTS

2010/0151307 A1* 6/2010 Naganuma ........ H01M 10/6557
429/99
2011/0206967 A1* 8/2011 Itsuki ...................... B60L 50/64
429/120
(Continued)

FOREIGN PATENT DOCUMENTS

JP 2017-184522 A 10/2017
JP 2017-216098 A 12/2017

*Primary Examiner* — Adam A Arciero
(74) *Attorney, Agent, or Firm* — McGinn I.P. Law Group, PLLC.

(57) ABSTRACT

An onboard-battery temperature controller to be disposed inside a vehicle, near a battery including a plurality of battery cells, is configured to control the temperature of the battery cells. The onboard-battery temperature controller includes a fluid heater, a heat generating body, and an arithmetic and control unit. The fluid heater is configured to heat the battery cells through heat exchange between a heating fluid circulating therein and the battery cells. The heat generating body is configured to be energized and generate heat, to be conducted to the battery cells to heat the battery cells. The arithmetic and control unit is configured to control operations of the fluid heater and the heat generating body on the basis of the temperature of the battery.

13 Claims, 15 Drawing Sheets

(51) Int. Cl.
    *H01M 10/615* (2014.01)
    *H01M 10/656* (2014.01)
    *H01M 10/6554* (2014.01)
    *B60L 58/26* (2019.01)
    *B60L 58/27* (2019.01)
    *H01M 10/613* (2014.01)

(52) U.S. Cl.
    CPC ....... *H01M 10/615* (2015.04); *H01M 10/625* (2015.04); *H01M 10/656* (2015.04); *H01M 10/6554* (2015.04)

(56) References Cited

U.S. PATENT DOCUMENTS

| | | | |
|---|---|---|---|
| 2012/0263984 A1* | 10/2012 | Krammer | B60L 58/26 |
| | | | 429/82 |
| 2015/0079433 A1* | 3/2015 | Tamai | B60L 53/14 |
| | | | 429/62 |

* cited by examiner

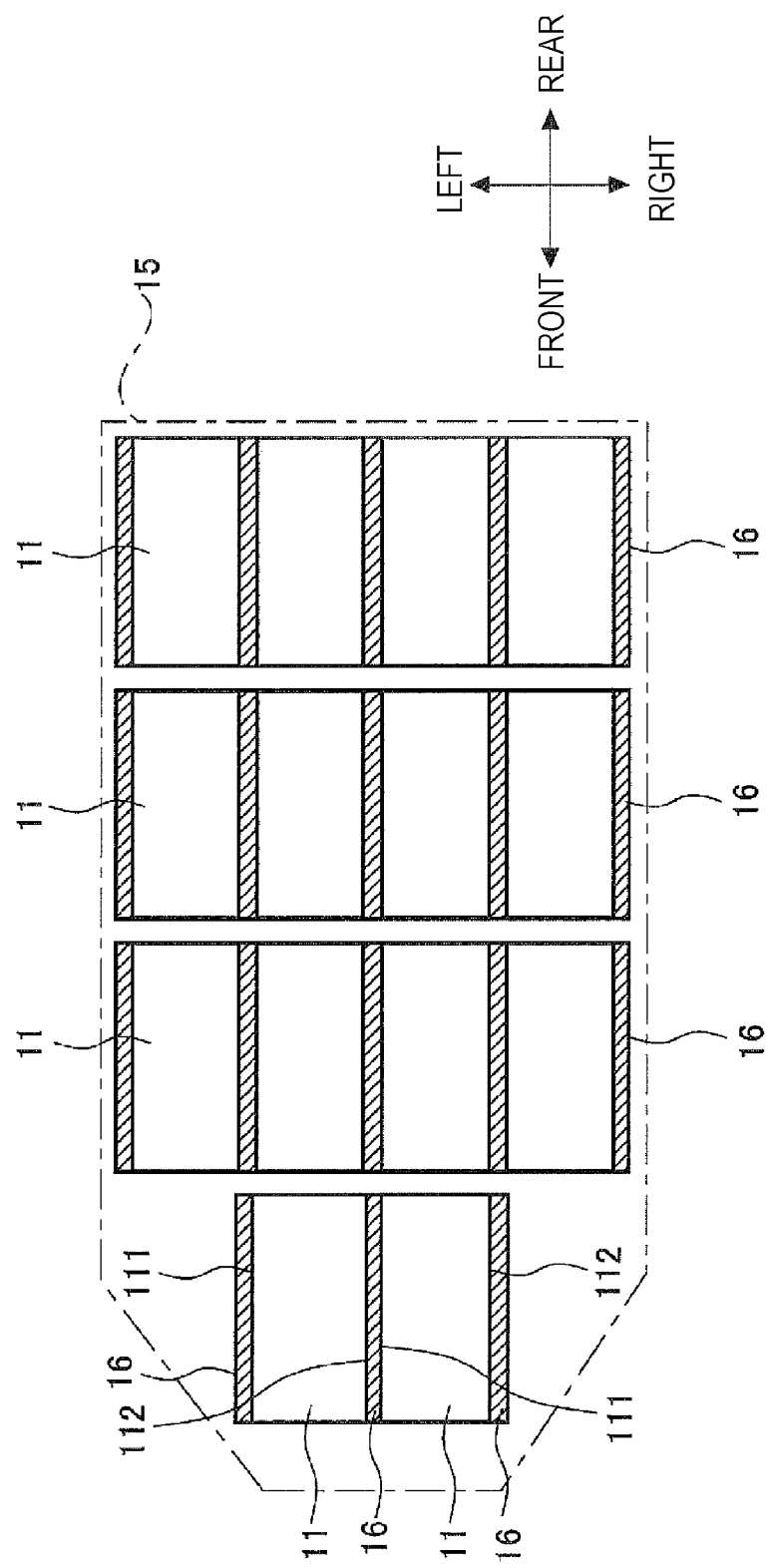

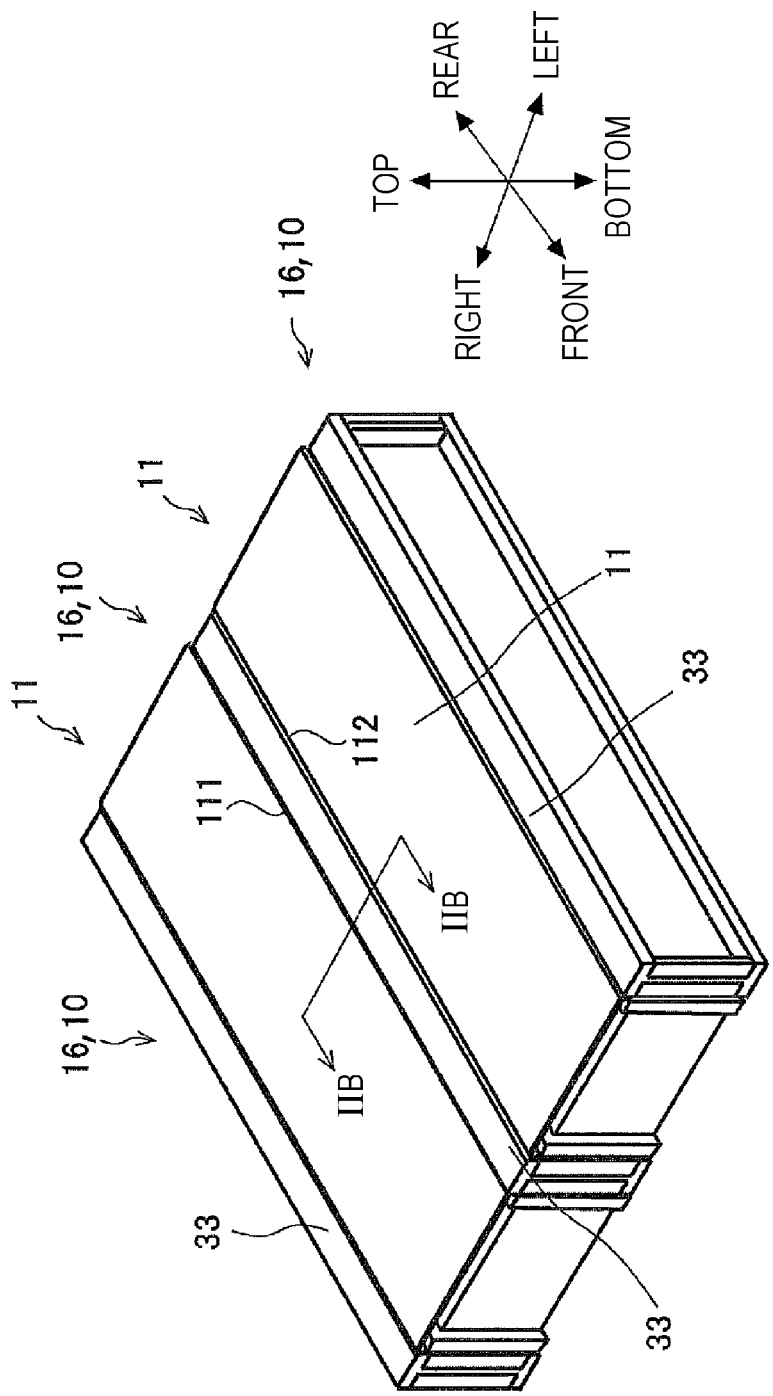

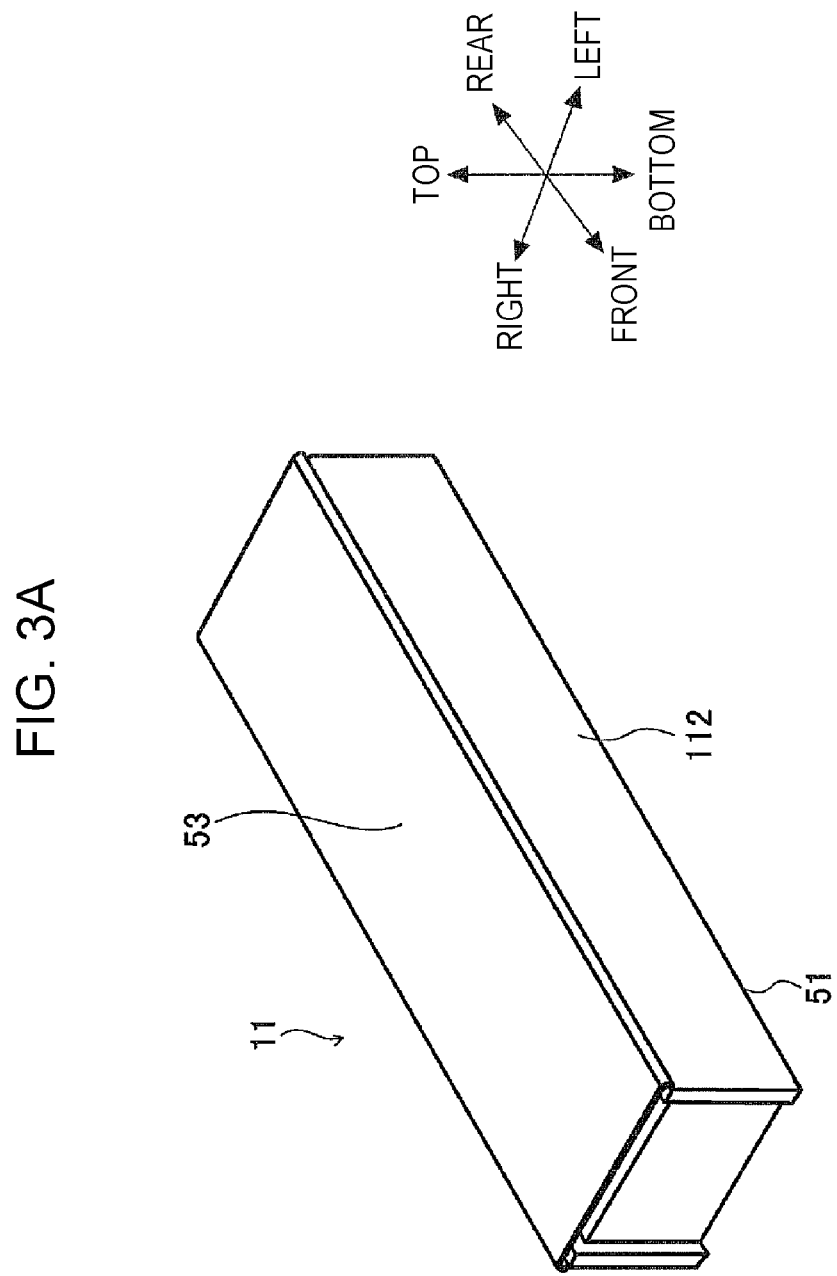

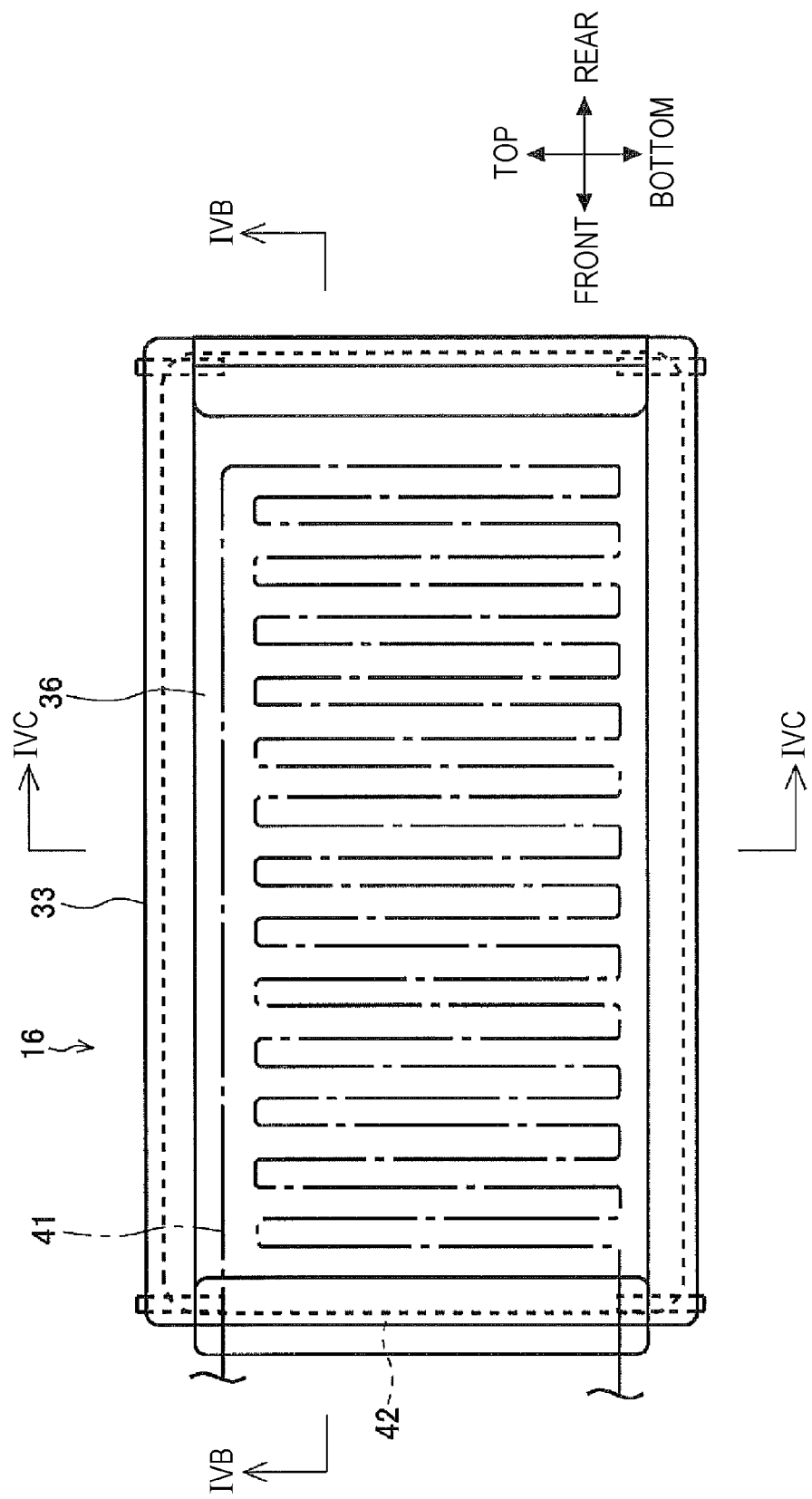

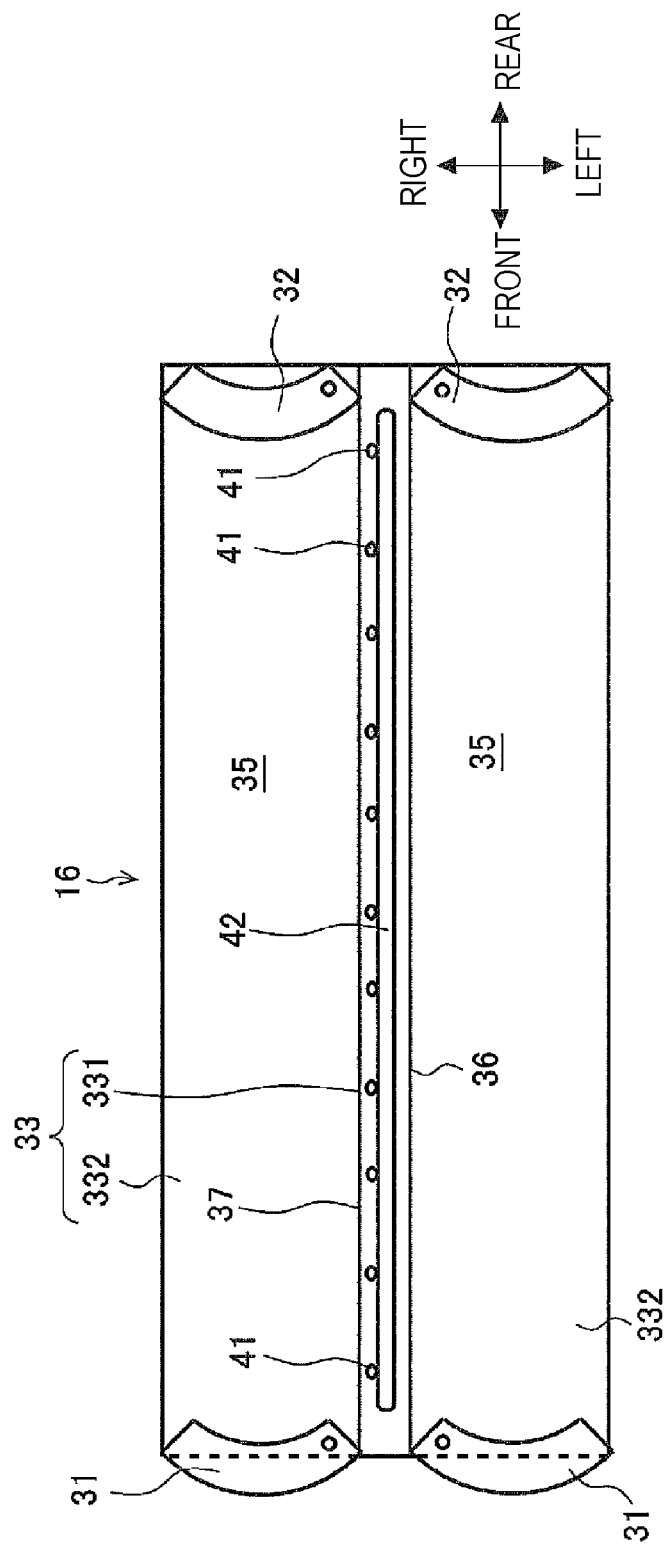

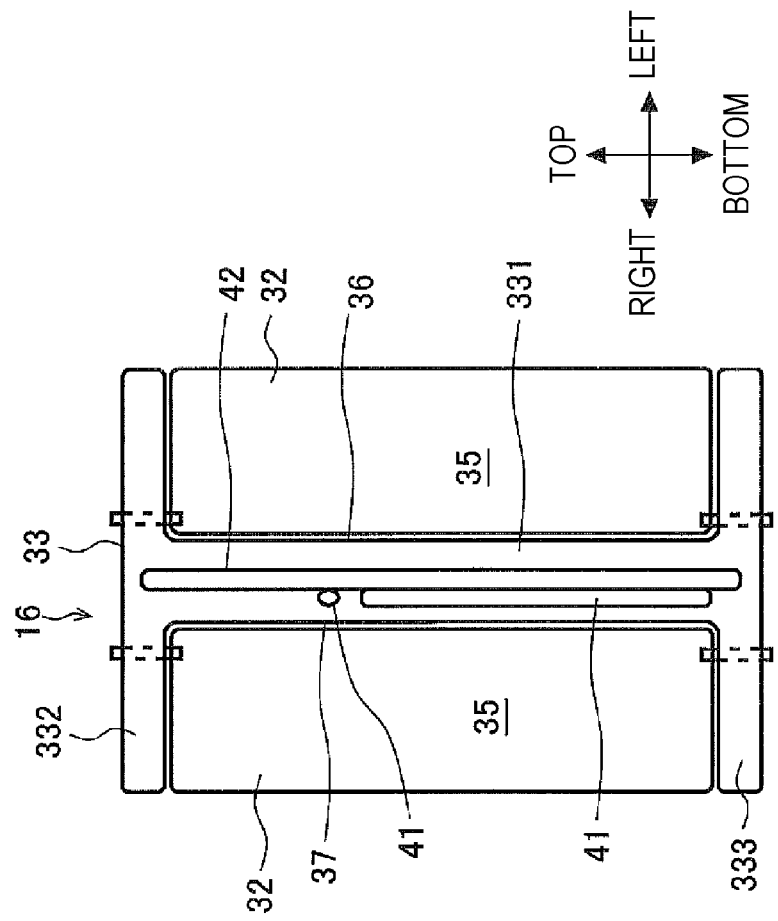

FIG. 6

| BATTERY TEMPERATURE | | -30°C | -20°C | -10°C | 0°C | 10°C | 20°C | 30°C | 40°C | 50°C | 60°C |
|---|---|---|---|---|---|---|---|---|---|---|---|
| TEMPERATURE CONTROL OPERATION | | | HEATING | | | STOP (TEMPERATURE-LEVELING OPERATION) | | | | COOLING | |
| USAGE RESTRICTION | | STOP OUTPUT | RESTRICT OUTPUT | | NORMAL USE | | | | | RESTRICT OUTPUT | STOP OUTPUT |
| DETAILS OF RESTRICTION | | STOP OUTPUT AND PROHIBIT IGNITION BECAUSE ELECTROLYTE FREEZES AT -30°C | RESTRICT OUTPUT BECAUSE ELECTROLYTE DOES NOT WORK WELL AT EXTREMELY LOW TEMPERATURE AND CHARGING/DISCHARGING EFFICIENCY IS LOW | | NORMAL USE IS POSSIBLE | | | | | REDUCE OUTPUT TO SUPPRESS HEAT GENERATION BY BATTERY | STOP OUTPUT FROM BATTERY AND PROHIBIT IGNITION BECAUSE BATTERY DETERIORATION PROGRESSES |
| CHARGING | HEATING WIRE | | | OPERATE | | STOP | | | | | |
| | TEMPERATURE CONTROL PLATE | | | | | | | | STOP | STOP | |
| CHARGING + AIR-CONDITIONING | HEATING WIRE | | | OPERATE | | | | | STOP | | |
| | TEMPERATURE CONTROL PLATE | | OPERATE | | | | | | STOP | | |
| LEFT OR DRIVEN WITHOUT BEING CHARGED | HEATING WIRE | | | OPERATE | | | | | STOP | | |
| | TEMPERATURE CONTROL PLATE | | STOP | | | BASICALLY STOP CIRCULATE TEMPERATURE-LEVELING WATER (25°C) WHEN TEMPERATURE DIFFERENCE BETWEEN BATTERY CELLS IS 3°C OR MORE | | | | CIRCULATE WATER WITH TEMPERATURE OF 15°C OR LESS TO COOL DOWN THE BATTERY | | STOP |
| ANTI-CONDENSATION OPERATION | HEATING WIRE | | STOP | | | OPERATE WHEN TEMPERATURE DIFFERENCE BETWEEN OUTSIDE AIR AND BATTERY IS GREATER THAN 20°C (STOP WHEN BATTERY TEMPERATURE IS 35°C AT MAXIMUM) | | | | | |

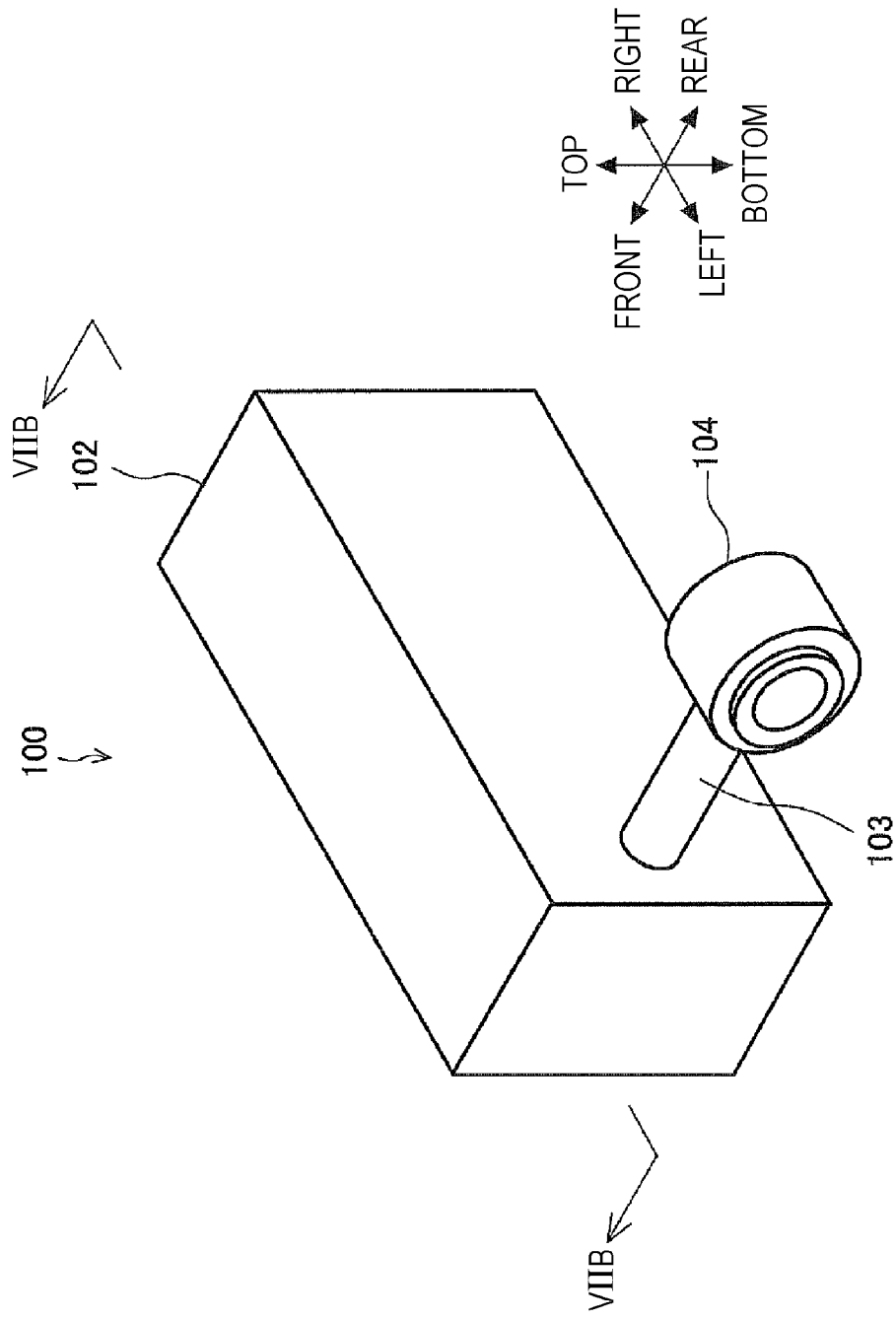

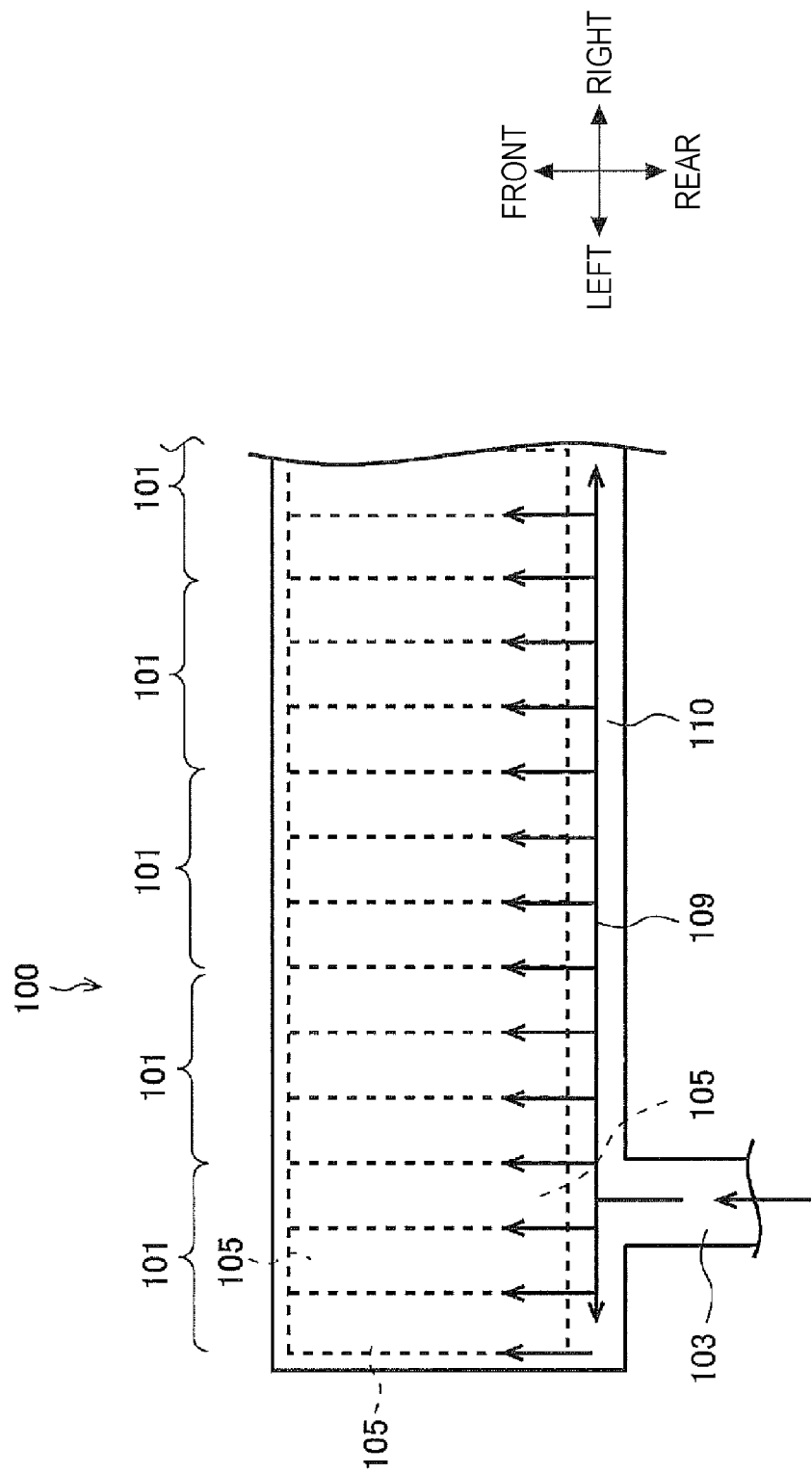

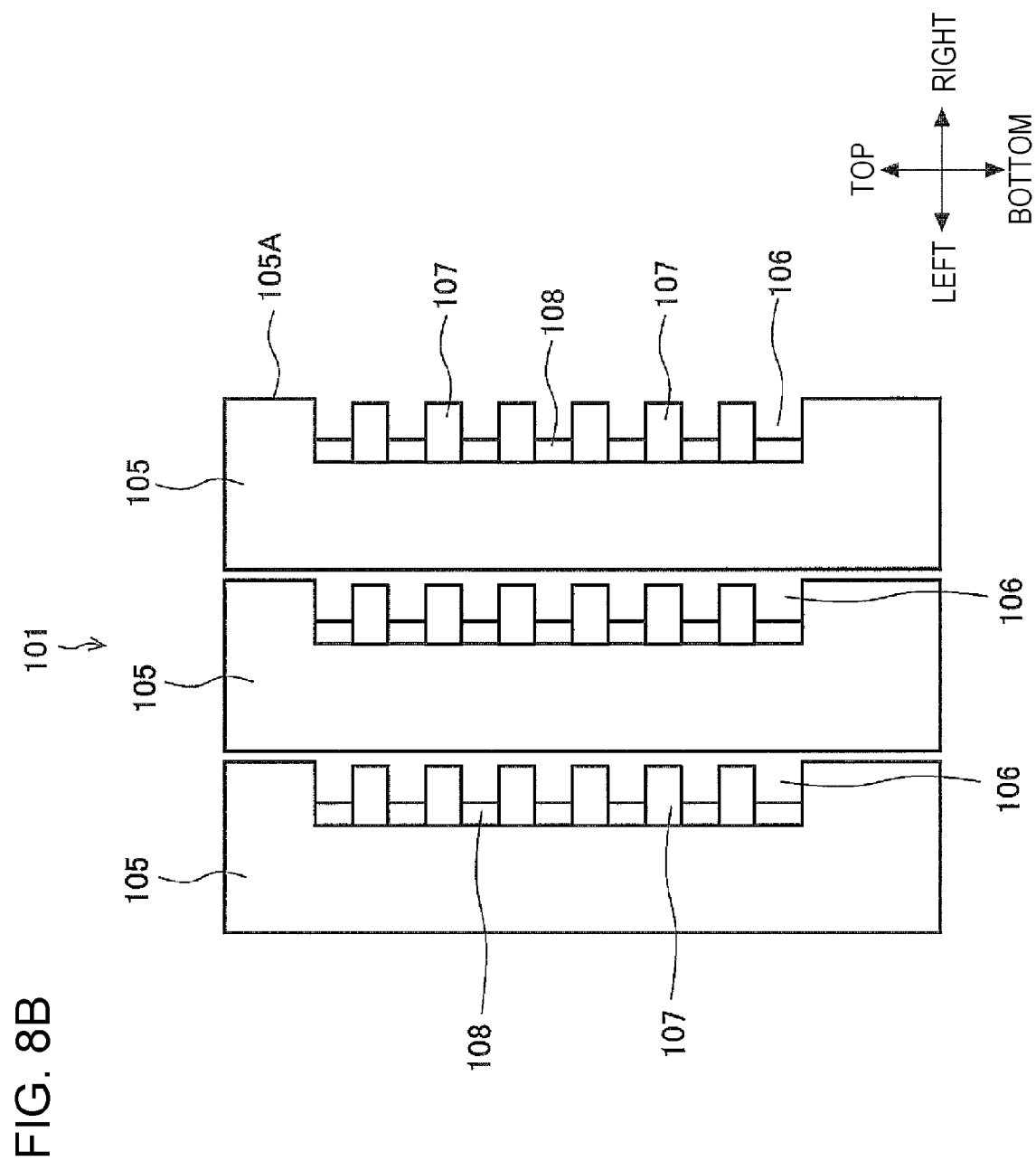

ONBOARD-BATTERY TEMPERATURE CONTROLLER

CROSS-REFERENCE TO RELATED APPLICATIONS

The present application claims priority from Japanese Patent Application No. 2019-063652 filed on Mar. 28, 2019, the entire contents of which are hereby incorporated by reference.

BACKGROUND

The disclosure relates to an onboard-battery temperature controller and, more specifically, to an onboard-battery temperature controller that heats a battery with multiple heat sources.

A known battery 100 having a heating mechanism has a structure illustrated in FIGS. 7A to 8B. FIG. 7A is a perspective view of the battery 100. FIG. 7B is a sectional view of the battery 100, taken along line VIIB-VIIB in FIG. 7A. FIG. 8A is a perspective view of cell stacks 101 of the battery 100. FIG. 8B is a sectional view of the cell stacks 101 of the battery 100, taken along line VIIIB-VIIIB in FIG. 8A.

As illustrated in FIG. 7A, the battery 100 mainly includes a box-shaped housing 102, multiple cell stacks 101 (see FIG. 7B) disposed in the housing 102, a duct 103 communicating with the interior of the housing 102, and a blower 104 coupled to the duct 103.

For example, five cell stacks 101 are installed in the housing 102. The battery 100 is controlled by a power control unit (PCU) (not illustrated) installed in a vehicle and supplies power to a motor etc., installed in the vehicle.

As illustrated in FIG. 7B, the blower 104 is controlled by a battery control unit (BCU) (not illustrated) of a battery system. When cells 105 constituting the cell stacks 101 are cooled, the blower 104 is actuated and blows outside air into the housing 102 (see FIG. 7A). The air blown into the housing 102 flows through an airflow path 110 and then through gaps between the cells 105, thus cooling the cells 105 (solid-line arrows 109 show the airflow).

As illustrated in FIG. 8A, each cell stack 101 includes multiple cells 105. The cells 105 are formed of, for example, secondary batteries, such as lithium-ion batteries. Each cell 105 has, in a side surface 105A thereof, a recess 106 extending in the longitudinal direction (front-rear direction). In the recess 106, multiple projections 107 for rectifying airflow and a wire 108, serving as a heat-conducting heater, are provided.

The wire 108 is, for example, a metal wire, such as a copper wire. The wire 108 is coupled to a power supply unit (not illustrated) and, when the wire 108 receives power, the wire 108 generates heat and heats the cell 105 from outside. As illustrated, the wire 108 is uniformly disposed over the side surface 105A as much as possible so as to evenly heat the cell 105.

As illustrated in FIG. 8B, in each cell stack 101, multiple cells 105 are disposed adjacent to one another. The recesses 106 serve as gaps between adjoining cells 105 and are used as cooling-air passages penetrating in the longitudinal direction (front-rear direction) of the cell stack 101 (for example, see Japanese Unexamined Patent Application Publication No. 2017-184522).

JP-A No. 2017-216098 (FIG. 2 and the description thereof) discloses a secondary-battery temperature controller for a vehicle, in which both an electric heater and a latent-heat storage medium are used as heat sources for heating the battery. Therein, battery cells are immersed in the latent-heat storage medium, and the electric heater is disposed below the battery cells.

SUMMARY

An aspect of the disclosure provides an onboard-battery temperature controller to be disposed inside a vehicle, near a battery including a plurality of battery cells. The onboard-battery temperature controller is configured to control the temperature of the battery cells. The onboard-battery temperature controller includes a fluid heater, a heat generating body, and an arithmetic and control unit. The fluid heater is configured to heat the battery cells through heat exchange between a heating fluid circulating therein and the battery cells. The heat generating body is configured to be energized and generate heat to be conducted to the battery cells to heat the battery cells. The arithmetic and control unit is configured to control operations of the fluid heater and the heat generating body on the basis of the temperature of the battery.

An aspect of the disclosure provides an onboard-battery temperature controller to be disposed inside a vehicle, near a battery including a plurality of battery cells. The onboard-battery temperature controller is configured to control the temperature of the battery cells. The onboard-battery temperature controller includes a fluid heater, a heat generating body, and circuitry. The fluid heater is configured to heat the battery cells through heat exchange between a heating fluid circulating therein and the battery cells. The heat generating body is configured to be energized and generate heat to be conducted to the battery cells to heat the battery cells. The circuitry is configured to control operations of the fluid heater and the heat generating body on the basis of the temperature of the battery.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 1B is a plan view of a vehicle having an onboard-battery temperature controller according to an embodiment of the disclosure;

FIG. 2A is a perspective view.

FIG. 3A is a perspective view.

FIG. 4A is a side view, FIG. 4B is a sectional view, and FIG. 4C is a sectional view of the onboard-battery temperature controller according to the embodiment of the disclosure;

FIG. 6 is a table showing the detail of temperature control etc., of the onboard battery according to the embodiment of the disclosure;

FIG. 7A is a perspective view, and FIG. 7B is a sectional view of a known battery; FIG. 8B is a sectional view of cell stacks of the known battery.

DETAILED DESCRIPTION

In the technology disclosed in JP-A No. 2017-184522, the wire 108, which is a heating wire, is energized and generates heat, thus heating the cells 105 using the thermal conduction principle. However, heating by the wire 108 takes a long time. Moreover, if it is intended to heat the entire cells 105 with the wire 108 alone, the cells 105 are surrounded by the wire 108, which may increase the heating cost.

In the secondary-battery temperature controller disclosed in JP-A No. 2017-216098, the battery cells are heated by using both the electric heater and the latent-heat storage medium. Hence, the battery cells are heated in a short time by the latent-heat storage medium. However, which of the electric heater and the latent-heat storage medium is used is determined basically according to the temperature of the battery cells, and the conditions closely related to charging/discharging of the battery cells, such as the vehicle's movable condition and the charging/discharging status of the battery cells, are not taken into consideration.

It is desirable to provide an onboard-battery temperature controller that can efficiently heat the battery with a fluid heater and a heat generating body that are effectively combined together by taking into consideration various conditions of the vehicle and the battery.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
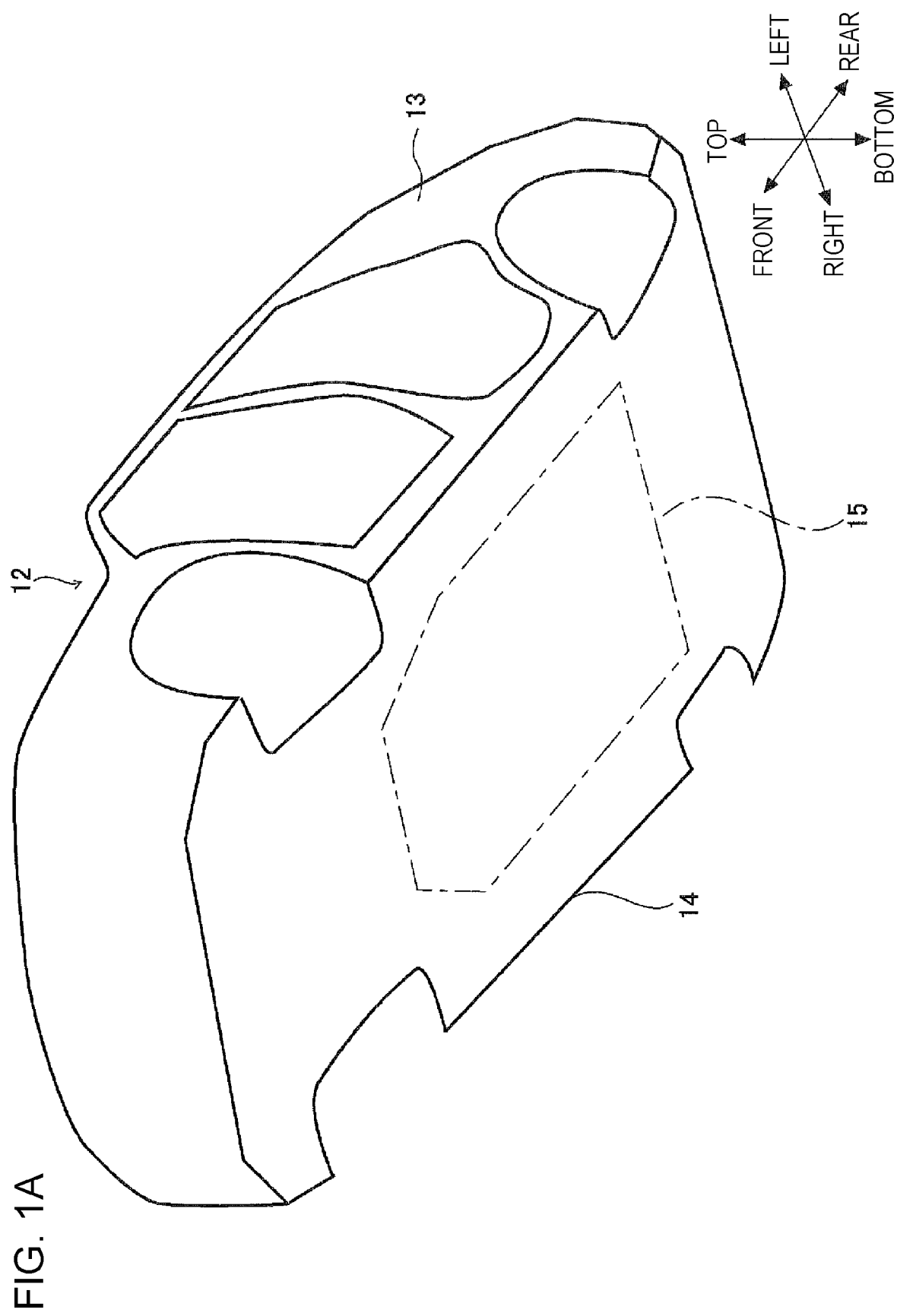
FIG. 1A is a perspective view.

FIG. 1A is a perspective view of a vehicle 12 loaded with onboard-battery temperature controllers 10 (see FIG. 5) and onboard batteries 11 according to this embodiment. FIG. 1B is a plan view illustrating the arrangement of the onboard-battery temperature controllers 10 and the onboard batteries 11 according to this embodiment. Herein, because the onboard batteries 11 each include multiple battery cells 52 (described below), the onboard batteries 11 are also referred to as battery modules, battery stacks, batteries, etc.

As illustrated in FIG. 1A, the vehicle 12, such as an automobile or a train, is loaded with the onboard batteries 11 (see FIG. 1B) for supplying power to the motor and various electric components. Examples of the vehicle 12 include an electric vehicle (EV), a hybrid electric vehicle (HEV), and a plug-in hybrid electric vehicle (PHEV). These vehicles 12 are also loaded with multiple onboard batteries 11 having a high power storage function.

FIG. 1A is a plan view of the vehicle 12 having the onboard batteries 11. The vehicle 12 mainly includes a vehicle body 13, multiple onboard batteries 11 disposed in a battery area 15 near a bottom surface 14 of the vehicle 12, a driving motor 25 (see FIG. 5) driven by the power supplied from the onboard batteries 11, and tires (not illustrated) rotated by the driving force from the driving motor 25.

As illustrated in FIG. 1B, the onboard batteries 11 are disposed in a matrix in the battery area 15 of the vehicle 12. The onboard batteries 11 have, for example, a substantially rectangular parallelepiped shape and are disposed such that the longitudinal direction thereof is parallel to the front-rear direction of the vehicle 12. By efficiently arranging the onboard batteries 11 in the battery area 15 so as to install a large number of onboard batteries 11 in the vehicle 12, it is possible to increase the continued mileage of the vehicle 12.

As illustrated, heaters 16 of the onboard-battery temperature controllers 10 are disposed along side surfaces 111 and 112, extending in the longitudinal direction, of the onboard batteries 11. The heaters 16 are disposed so as to sandwich the onboard batteries 11 and heat the onboard batteries 11 from the side surfaces 111 and 112 thereof. When the vehicle 12 charges or discharges the onboard batteries 11 in a low-temperature environment, the heaters 16 heat the onboard batteries 11 to an appropriate temperature range. Thus, it is possible to maintain good battery characteristics, including output characteristics and charging/discharging characteristics.

In details, in the front row in the battery area 15 of the vehicle 12, two onboard batteries 11 are disposed, and three heaters 16 are disposed so as to adjoin the onboard batteries 11. In each of the second to fourth rows, four onboard batteries 11 are disposed, and five heaters 16 are disposed so as to adjoin the onboard batteries 11.

As will be described below, first doors 31 (see FIG. 4B) and second doors 32 (see FIG. 4B), which can be opened and closed, are disposed near the ends, in the longitudinal direction (front-rear direction of the vehicle 12), of each heater 16. The onboard batteries 11 and the heaters 16 adjoin each other with spaces 35 (see FIG. 4B) therebetween, and the spaces 35 are closed or opened by the first doors 31 and the second doors 32. When the onboard batteries 11 are to be air-cooled, the first doors 31 and the second doors 32 are opened, allowing the spaces 35 to communicate with the outside. In this state, the spaces 35 are open and serve as cooling-air passages. When the onboard batteries 11 are heated, the first doors 31 and the second doors 32 are closed, restricting communication between the spaces 35 and the outside. In this state, the spaces 35 are sealed or almost sealed.

Figure 2B:
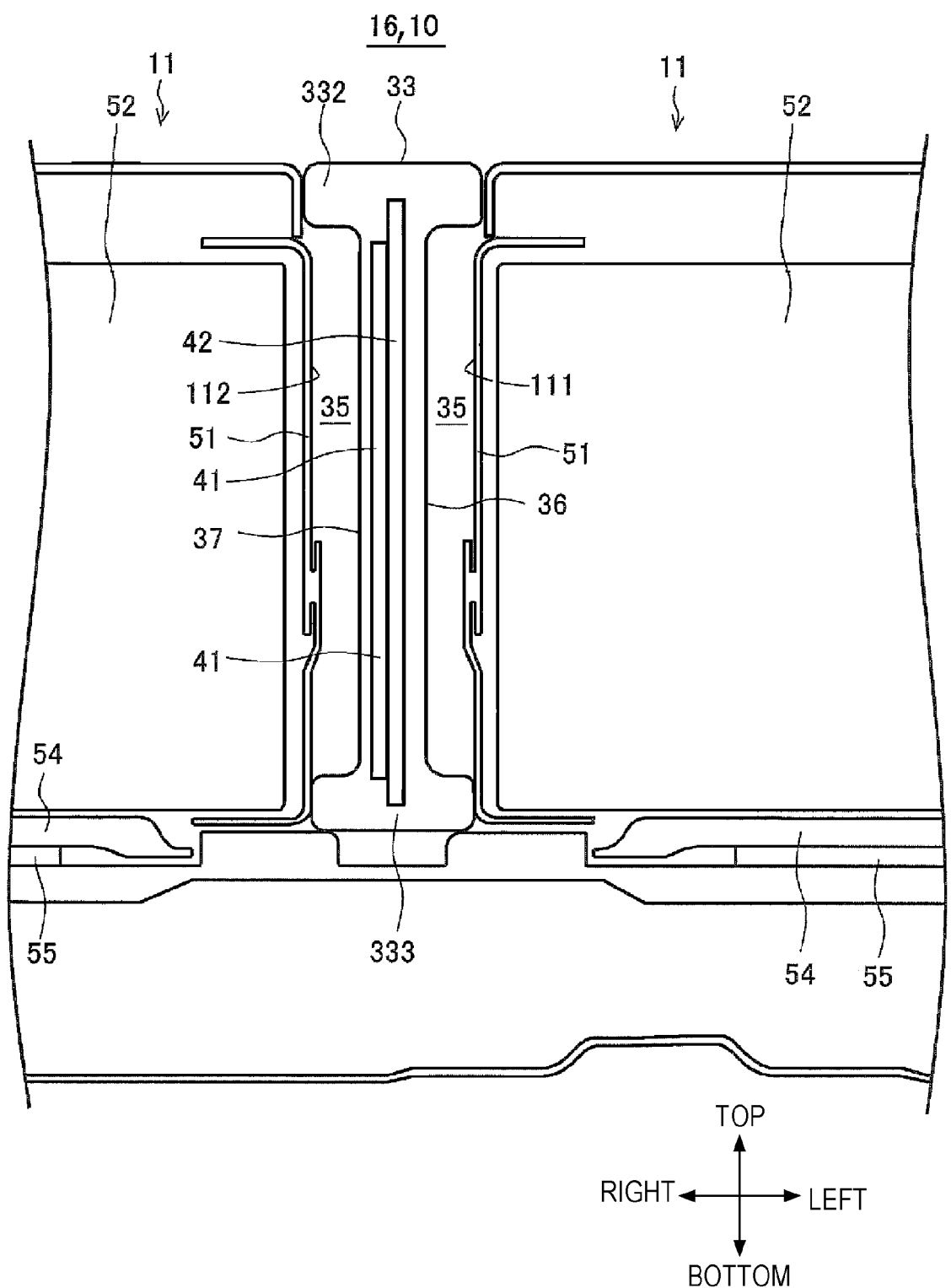
FIG. 2B is a sectional view of the onboard-battery temperature controller according to the embodiment of the disclosure.

Referring to FIGS. 2A and 2B, heating of the onboard batteries 11 with the onboard-battery temperature controllers 10 will be described. FIG. 2A is a perspective view illustrating the arrangement of the onboard-battery temperature controllers 10. FIG. 2B is a sectional view taken along line IIB-IIB in FIG. 2A, illustrating heating of the onboard batteries 11 with the onboard-battery temperature controllers 10.

FIG. 2A illustrates the two onboard batteries 11 and the three onboard-battery temperature controllers 10 disposed in the front row in the battery area 15 of the vehicle 12 illustrated in FIG. 1B. The heaters 16 of the onboard-battery temperature controllers 10 are disposed along the side surfaces 111 and 112 of the onboard batteries 11 so as to sandwich the onboard batteries 11. One heater 16 is disposed between two onboard batteries 11. Hence, it is possible to simultaneously heat two onboard batteries 11 with one heater 16.

As illustrated in FIG. 2B, end faces of a top surface portion 332 and end faces of a bottom surface portion 333 of a housing 33 of the heater 16 are in tight contact with portions near the outer peripheral ends of the side surfaces 111 and 112 of the onboard batteries 11 of the onboard batteries 11. The spaces 35 are formed between the battery cells 52. A heating wire 41 stitched on a nonwoven cloth 42 is disposed in each space 35.

Figure 3B:
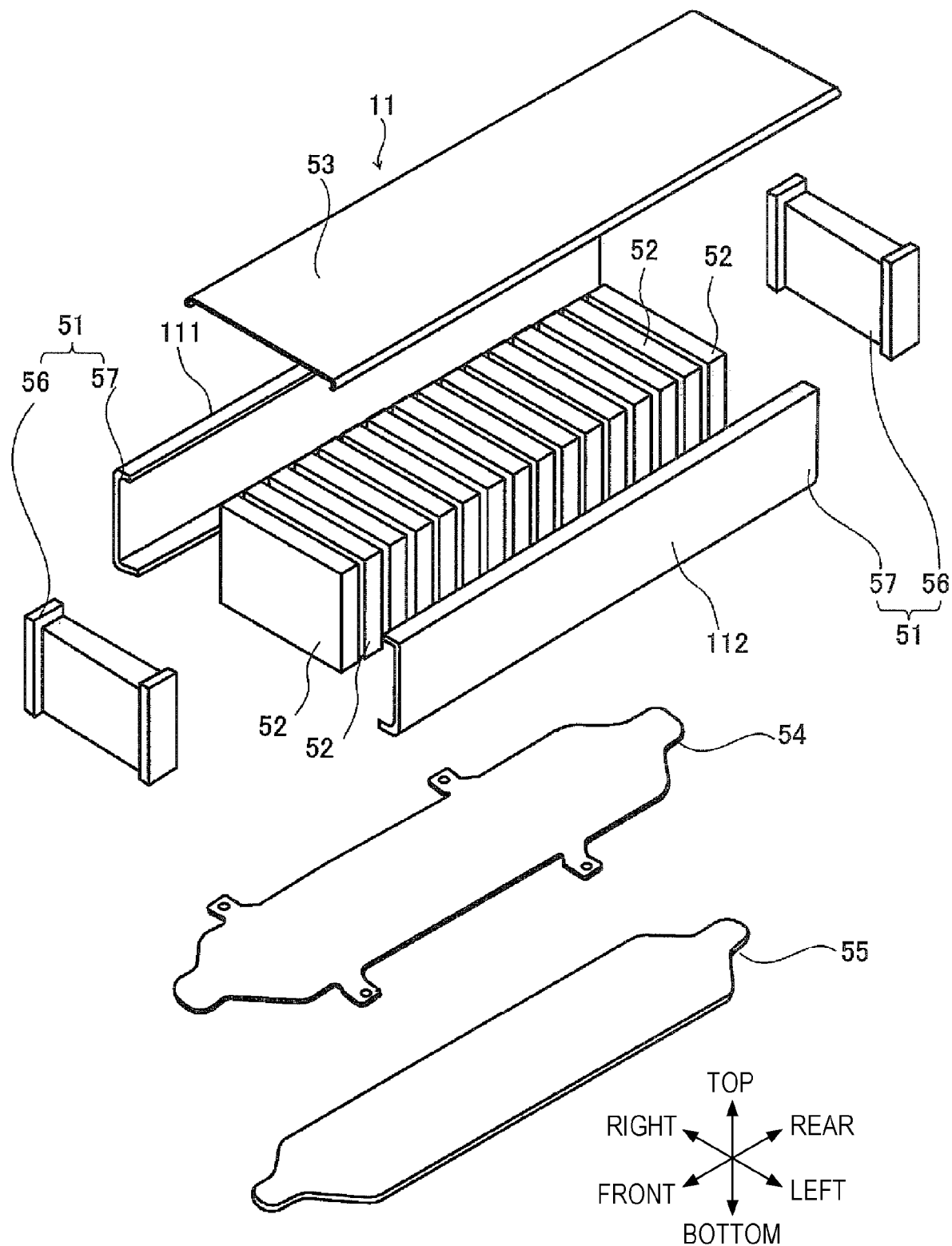
FIG. 3B is an exploded perspective view of an onboard battery according to the embodiment of the disclosure.

Referring to FIGS. 3A and 3B, the onboard batteries 11 will be described. FIG. 3A is a perspective view of an onboard battery 11. FIG. 3B is an exploded perspective view of the onboard battery 11.

As illustrated in FIG. 3A, the onboard battery 11 mainly includes: a storage case 51; multiple battery cells 52 (see FIG. 3B) accommodated in the storage case 51; a cover 53 that closes the top surface of the storage case 51; a temperature control plate 54 (see FIG. 3B), serving as a fluid passage, disposed below the storage case 51; and a heat insulating member 55 (see FIG. 3B) disposed below the temperature control plate 54.

The onboard battery 11 has, for example, a substantially rectangular parallelepiped shape. The side surfaces 111 and 112, which are provided at the sides of the onboard battery 11, are disposed such that the longitudinal direction thereof is parallel to the front-rear direction of the vehicle 12 (see FIG. 1A) and such that the transverse direction thereof is parallel to the top-bottom direction of the vehicle 12. As described above, the width of the side surfaces 111 and 112 in the longitudinal direction is substantially equal to the width of the side surfaces 36 and 37 of the housing 33 in the longitudinal direction. The width of the side surfaces 111 and 112 in the transverse direction is substantially equal to the width of the side surfaces 36 and 37 of the housing 33 in the transverse direction.

As illustrated in FIG. 3B, the storage case 51 is mainly formed of a pair of end plates 56 and a pair of binding bars 57 and supports the battery cells 52 by surrounding the battery cells 52 from the front, rear, left, and right sides thereof. The end plates 56 are made of, for example, resin plates or steel plates and cover the front and rear side surfaces of the battery cells 52 located at the ends. The binding bars 57 are made of, for example, resin plates or steel plates and cover the right and left side surfaces of the battery cells 52. The cover 53 is made of, for example, a resin plate or a steel plate and covers the battery cells 52 from above.

The battery cells 52 are, for example, secondary batteries, such as nickel-hydrogen batteries or lithium-ion batteries. The battery cells 52 have, for example, a square or rectangular flat plate shape and are disposed at equal intervals in the front-rear direction of the vehicle 12 so as to leave small gaps therebetween. The battery cells 52 are connected in series via a conducting connecting plate (not illustrated), thus forming a high-output onboard battery 11. Although not illustrated, a cathode terminal and an anode terminal projecting upward are disposed on the top surface of each battery cell 52.

The temperature control plate 54 is disposed near the lower surfaces of the battery cells 52. In one embodiment, the temperature control plate 54 may serve as a "fluid heater". The temperature control plate 54 has, in the interior thereof, a pipe (not illustrated) through which a temperature-controlling fluid, such as water, flows. By disposing the temperature control plate 54 below the battery cells 52, the battery characteristics during charging/discharging of the battery cells 52 are improved. In one embodiment, when the temperature of the battery cells 52 is higher than the usable temperature range, a cooling medium is circulated through the temperature control plate 54 to cool the battery cells 52. When the temperature of the battery cells 52 is lower than the usable temperature range, a heating medium is circulated through the temperature control plate 54 to heat the battery cells 52.

The heat insulating member 55 is a plate-shaped member disposed below the temperature control plate 54 and is made of an insulating synthetic resin foam, such as polyethylene foam. By disposing the heat insulating member 55 below the temperature control plate 54, it is possible to insulate the temperature control plate 54 from the outside, thus increasing the temperature control effect of the temperature control plate 54.

Referring to FIGS. 4A to 4C, the heater 16 of the onboard-battery temperature controller 10 will be described. FIG. 4A is a side view of the heater 16, FIG. 4B is a sectional view of the heater 16 of the onboard-battery temperature controller 10 according to this embodiment, taken along line IVB-IVB in FIG. 4A, and FIG. 4C is a sectional view of the heater 16 of the onboard-battery temperature controller 10 according to this embodiment, taken along line IVC-IVC in FIG. 4A.

As illustrated in FIGS. 4A and 4C, the housing 33 of the heater 16 is elongated in the front-rear direction of the vehicle 12 and has, for example, a substantially H-shaped sectional shape. A wall-shaped body 331 of the housing 33 is formed so as to extend in the top-bottom direction at the center in the transverse direction of the housing 33 (i.e., the left-right direction of the vehicle 12) and so as to extend in the longitudinal direction of the housing 33. The top surface portion 332 of the housing 33 is formed at the upper end of the wall-shaped body 331, and the bottom surface portion 333 of the housing 33 is formed at the lower end of the wall-shaped body 331. The top surface portion 332 and the bottom surface portion 333 extend in the longitudinal direction of the housing 33.

As illustrated in FIG. 4B, the first doors 31 and the second doors 32, serving as opening/closing members, are provided near the ends of the housing 33 in the longitudinal direction. When the first doors 31 and the second doors 32 are closed, as illustrated in FIG. 4B, the air, serving as heat conducting passages, stays inside the spaces 35. After the temperature of the air inside the spaces 35 has raised to a certain value, the temperature is easily maintained. As a result, by adjusting the amount of power supplied from a sub battery 23 (see FIG. 6) to the heating wire 41, the power consumption of the heater 16 can be reduced.

Furthermore, in the housing 33, inside the first doors 31 and the second doors 32, the spaces 35 extend along side surfaces 36 and 37 of the wall-shaped body 331. In a state in which the heater 16 is disposed so as to adjoin the side surfaces 111 and 112 of the onboard batteries 11 (see FIG. 2B), the spaces 35 are located between the side surface 111 of the onboard battery 11 and the side surface 36 of the housing 33 and between the side surface 112 of the onboard battery 11 and the side surface 37 of the housing 33. When the first doors 31 and the second doors 32 are closed, the spaces 35 are substantially sealed, and the air inside the spaces 35 is used as the heat conducting passages and heats the onboard battery 11.

When the first doors 31 and the second doors 32 are open, the spaces 35 serve as cooling-air passages and cool the onboard battery 11 with air. When the first doors 31 and the second doors 32 pivot clockwise about the inner ends thereof in the left-right direction, the first doors 31 and the second doors 32 are opened. When the first doors 31 and the second doors 32 are open, the air flows in, for example, a direction from the first doors 31 toward the second doors 32. The outside air enters the spaces 35 from the first doors 31, cools the onboard battery 11 from the inside of the spaces 35, and flows out from the second doors 32. The onboard battery 11 is cooled in this way.

As illustrated in FIGS. 4A and 4B, the housing 33 of the heater 16 accommodates the heating wire 41 and the nonwoven cloth 42 that supports the heating wire 41. In one embodiment, the heating wire 41 may serve as a "heat generating body". The heating wire 41 is stitched on the surface of the nonwoven cloth 42 and generates heat by receiving the supply of power from the sub battery 23 (see FIG. 5). The nonwoven cloth 42 is formed of, for example, a glass fiber having good heat conductivity and is disposed so as to substantially correspond to the entire side surfaces 36 and 37 of the housing 33. The nonwoven cloth 42 supports the heating wire 41 and efficiently conducts heat generated by the heating wire 41 to the air layers therearound.

As illustrated in FIG. 4C, the second doors 32 are disposed near one end of the housing 33 in the longitudinal direction. The second doors 32 are disposed with a clearance from the wall-shaped body 331, the top surface portion 332, and the bottom surface portion 333 so as to be able to pivot. The first doors 31 are disposed in the same manner.

As described above, the wall-shaped body 331 of the housing 33 accommodates the heating wire 41 and the nonwoven cloth 42. The heating wire 41 receives power from the sub battery 23 (see FIG. 6) to generate heat and, together with the nonwoven cloth 42 having good heat conductivity, effectively heats the air inside the spaces 35.

Figure 5:
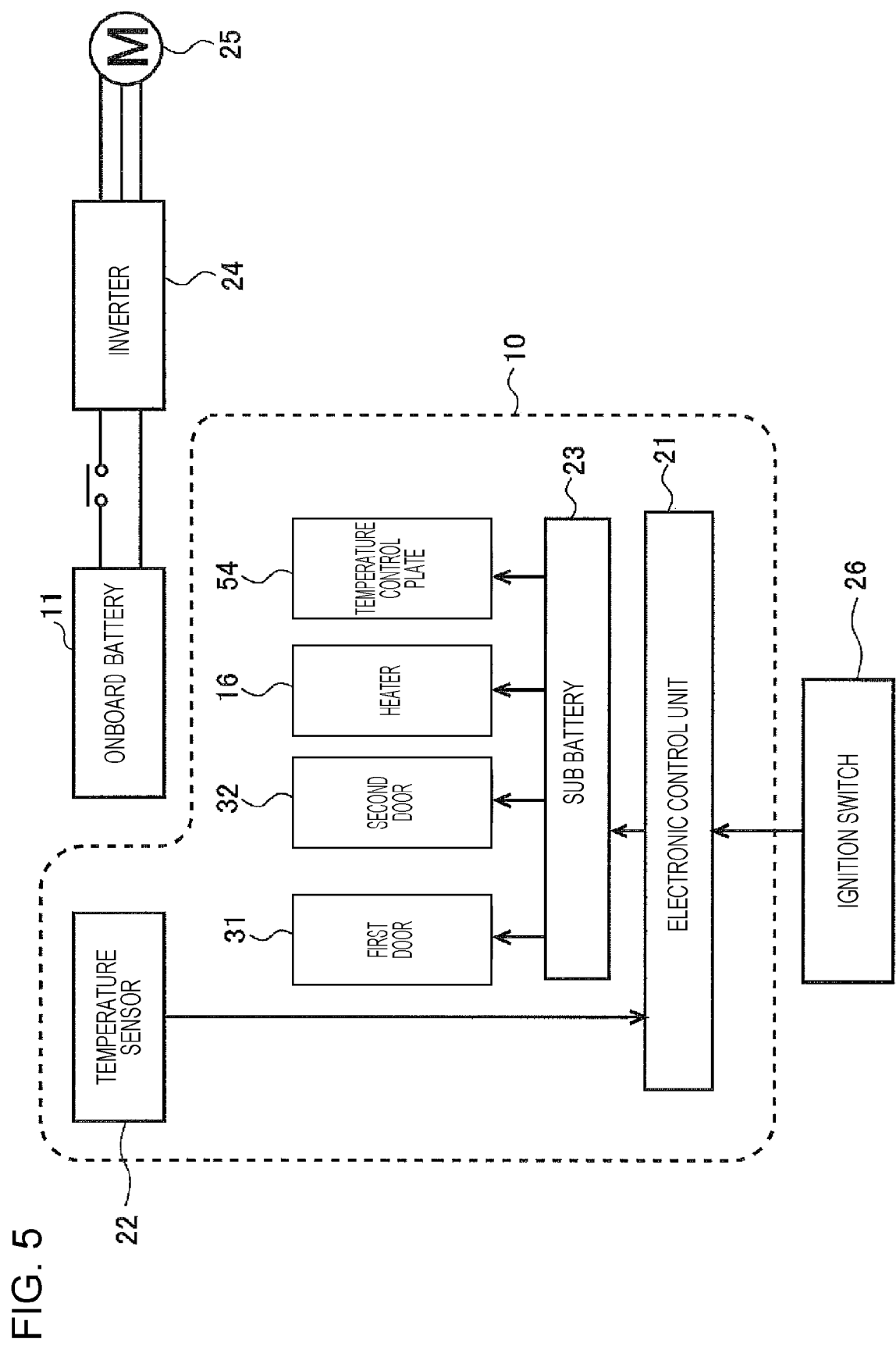
FIG. 5 is a block diagram of the onboard-battery temperature controller according to the embodiment of the disclosure.
Figure 8A:
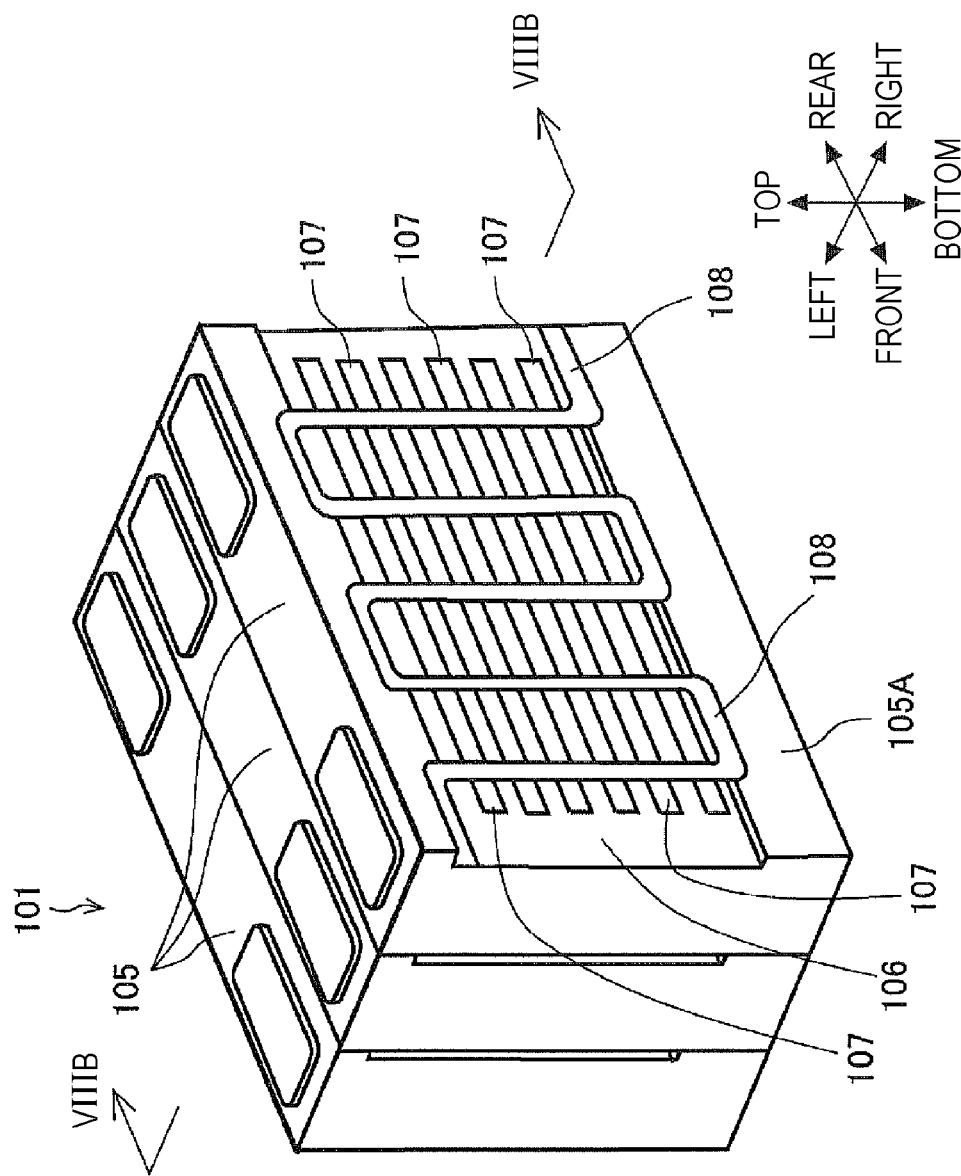
FIG. 8A is a perspective view.

FIG. 5 is a block diagram of the onboard-battery temperature controller 10. The onboard-battery temperature controller 10 mainly includes: an electronic control unit 21; the heater 16 for heating the onboard battery 11; temperature sensors 22 for measuring the temperature of the onboard battery 11; the first doors 31 and the second doors 32 that are opened or closed when the onboard battery 11 is air-cooled or heated; the temperature control plate 54, which is a fluid heater for heating the onboard battery 11; and the sub battery 23 for supplying power to the heater 16 and the like. Herein, the sub battery 23 receives power from the onboard battery 11 and the like.

The onboard battery 11 is, for example, a 350V high-voltage power supply source. The onboard battery 11 is coupled to the driving motor 25 via an inverter 24 and supplies power to the driving motor 25. The driving motor 25 outputs motive power for driving the driving wheels (not illustrated) of the vehicle 12 (see FIG. 1A).

The electronic control unit 21 includes a central processing unit (CPU), a read-only memory (ROM), a random-access memory (RAM), and the like and that performs various arithmetic operations for vehicle control. In one embodiment, the electronic control unit 21 may serve as an "arithmetic and control unit". The electronic control unit 21 is started by, for example, a driver pressing an ignition switch 26 of the vehicle 12 while applying the brake (not illustrated).

The temperature sensors 22 measure the temperature of the onboard battery 11. The temperature sensors 22 are attached to the battery cells 52 constituting the onboard battery 11, and the information indicating the temperatures of the battery cells 52 is transmitted to the electronic control unit 21.

The electronic control unit 21 stores, for example, the measurement values transmitted from the temperature sensors 22. When the onboard battery 11 is heated, the electronic control unit 21 causes the first doors 31 and the second doors 32 illustrated in FIG. 4B to pivot to a closed state and turns on the heater 16. As will be described below, the electronic control unit 21 also turns on the temperature control plate 54 according to the status of the onboard battery 11.

When the onboard battery 11 is cooled, the electronic control unit 21 causes the first doors 31 and the second doors 32 to pivot to an open state and turns off the heater 16 if the heater 16 is operating, and turns off the temperature control plate 54 if the temperature control plate 54 is operating. The method for effectively using the heater 16 and the temperature control plate 54 in combination will be described below with reference to FIG. 6.

Referring to the table in FIG. 6, the method for controlling the temperature of the onboard battery 11 with the onboard-battery temperature controller 10 will be described. In this embodiment, the heating wire 41 and the temperature control plate 54 are effectively combined to heat the onboard battery 11. As a result, it is possible to heat the onboard battery 11 with the heating wire 41 with a relatively small power consumption and to heat the onboard battery 11 quickly with the temperature control plate 54. Herein, although specific temperatures of the onboard battery 11 and the like will be mentioned below with reference to FIG. 6, such temperatures are merely examples, and the temperature of the onboard battery 11 and the like vary depending on the various conditions, such as the battery performance, etc.

The table in FIG. 6 shows, from above: the temperature of the onboard battery 11; the temperature control operation; the type of usage restriction of the onboard battery 11; the details of the usage restriction; the operations of the heating wire 41 and the temperature control plate 54 when only charging is performed; the operations of the heating wire 41 and the temperature control plate 54 when charging and vehicle-cabin air-conditioning are performed; the operations of the heating wire 41 and the temperature control plate 54 when the vehicle 12 is left or driven without being charged; and the operation of the heating wire 41 when anti-condensation operation is performed. Although the temperature of the onboard battery 11 is, for example, the average temperature of the battery cells 52 in the description below, it is also possible to use the temperature of a specific battery cell 52 as a representative value or to use the median or the like of the temperatures of the battery cells 52.

The electronic control unit 21 controls on/off of the heating wire 41 and the temperature control plate 54 on the basis of the output from the temperature sensors 22 that measure the temperature of the onboard battery 11. The electronic control unit 21 monitors the temperatures of all the battery cells 52 through the temperature sensors 22. The electronic control unit 21 performs the following control on the basis of, for example, the average temperature of the battery cells 52.

When the temperature of the onboard battery 11 is from −35° C. to 10° C., the electronic control unit 21 performs a heating operation for heating the onboard battery 11.

In this temperature control operation, as illustrated in FIG. 4B, the first doors 31 and the second doors 32 may be closed, and the heating wire 41 may be energized to heat the spaces 35, thus heating the onboard battery 11 by the heat conduction from the spaces 35. Moreover, referring to FIG. 3B, a high-temperature fluid may be circulated through the temperature control plate 54 to heat the onboard battery 11 by the heat conduction from the temperature control plate 54. The heating method using the heating wire 41 and the temperature control plate 54 in combination varies depending on the conditions of the vehicle 12 and the onboard battery 11, and the details thereof will be described below.

When the average temperature of the battery cells 52 measured by the temperature sensors 22 is from 10° C. to 35° C. (non-temperature-control range), the electronic control unit 21 does not control the temperature of the onboard battery 11. In this temperature range, the battery cells 52 can efficiently charge or discharge without being heated or cooled.

Although, in principle, the temperature of the onboard battery 11 is not controlled in the non-temperature-control range, it is possible to perform a temperature-leveling operation for leveling the temperatures of the battery cells 52 according to an instruction from the electronic control unit 21. The temperature may be leveled by appropriately performing the heating operation and the cooling operation. For example, when the temperature of any one of the battery cells 52 exceeds a high-temperature-side preset temperature, the above-described cooling operation is performed. When the temperature of any one of the battery cells 52 drops below a low-temperature-side preset temperature, the above-described heating operation is performed. By performing this temperature-leveling operation, it is possible to prevent a specific battery cell 52 from reaching an extremely low or high temperature. When the heating operation is to be performed as the temperature-leveling operation in the non-temperature-control range, the first doors 31 and the second doors 32, illustrated in FIG. 4B, may be closed to prevent warm air from escaping to the outside. When the cooling operation is performed as the temperature-leveling operation, the first doors 31 and the second doors 32, illustrated in FIG. 4B, may be opened to release the heat generated by the battery cells 52 to the outside.

When the average temperature of the battery cells 52 measured by the temperature sensors 22 is 35° C. or more (cooling range), the onboard battery 11 is cooled. In the cooling range, for example, the electronic control unit 21 opens the first doors 31 and the second doors 32, illustrated in FIG. 4B, to communicate between the spaces 35 and the outside, thus allowing cooling air to flow through the spaces 35. At this time, by blowing air with a fan (not illustrated), the circulation of the cooling air is facilitated. As a result of the cooling air passing through the spaces 35 and the battery cells 52 exchanging heat, the battery cells 52 are cooled. Furthermore, by circulating the cooling fluid through the temperature control plate 54 according to an instruction from the electronic control unit 21, the battery cells 52 can be cooled. Cooling with cooling air circulating through the spaces 35 and cooling with the temperature control plate 54 may be used either alone or simultaneously in combination.

Next, the type and the details of usage restriction of the onboard battery 11 at the respective temperature ranges will be described.

In the temperature range in which the temperature of the onboard battery 11 is from −35° C. to −25° C., the electronic control unit 21 stops the output from the onboard battery 11 and prohibits the ignition of the vehicle 12. The reason for stopping the output is that the electrolyte used in the onboard battery 11 freezes at a temperature of −25° C. or less.

In the temperature range in which the temperature of the onboard battery 11 is from −25° C. to −5° C., the electronic control unit 21 restricts the output from the onboard battery 11. The reason for restricting the output is that the electrolyte used in the onboard battery 11 does not work well, decreasing the charging or discharging efficiency.

In the temperature range in which the temperature of the onboard battery 11 is from −5° C. to 50° C., the electronic control unit 21 allows normal use of the output from the onboard battery 11. In one embodiment, the electronic control unit 21 allows charging and discharging of the onboard battery 11 without any special restriction.

In the temperature range in which the temperature of the onboard battery 11 is from 50° C. to 55° C., the electronic control unit 21 restricts the output from the onboard battery 11. In one embodiment, the electronic control unit 21 restricts the output when the onboard battery 11 is charged or discharged, thus reducing heat generated by the onboard battery 11.

In the temperature range in which the temperature of the onboard battery 11 is 55° C. or more, the electronic control unit 21 stops output from the onboard battery 11. In this temperature range, because the performance of the onboard battery 11 decreases, charging or discharging from the onboard battery 11 is prohibited. In other words, ignition is prohibited.

Next, a method for heating the onboard battery 11 by selectively using the heating wire 41 and the temperature control plate 54 depending on the status of the vehicle 12 and the onboard battery 11 will be described.

First, a case in which the vehicle 12 charges the onboard battery 11 by supplying power thereto and in which the vehicle-cabin air-conditioner is not operated will be described. Examples of the power supply for charging the onboard battery 11 include a generator driven by an onboard engine and an outside power supply. In this case, in the temperature range in which the temperature of the onboard battery 11 is −25° C. or less, the electronic control unit 21 operates neither the heating wire 41 nor the temperature control plate 54. In the temperature range in which the temperature of the onboard battery 11 is from −25° C. to 15° C., the electronic control unit 21 causes a heating fluid to circulate through the temperature control plate 54 to heat the onboard battery 11 while stopping the heating wire 41.

With this configuration, it is possible to supply the cooling water (for example, an antifreeze solution) that has cooled the engine to the temperature control plate 54 and thus to effectively and quickly heat the onboard battery 11. By not supplying power for generating heat to the heating wire 41, it is possible to preferentially supply power to the onboard battery 11. In the temperature range in which the temperature of the onboard battery 11 is 15° C. or more, the onboard battery 11 is sufficiently heated. Hence, the electronic control unit 21 stops the heating operations of the heating wire 41 and the temperature control plate 54.

Next, a case in which the vehicle-cabin air-conditioner is used while the onboard battery 11 is charged will be described.

An example situation of this case is that an occupant takes a rest in the vehicle cabin while charging the onboard battery 11 with power supplied from a charging facility. The vehicle-cabin air-conditioning at this time is also called pre-air-conditioning. In one embodiment, in the temperature range in which the temperature of the onboard battery 11 is from −35° C. to −25° C., the electronic control unit 21 operates neither the heating wire 41 nor the temperature control plate 54. In the temperature range in which the temperature of the onboard battery 11 is from −25° C. to −5° C., the electronic control unit 21 operates both the heating wire 41 and the temperature control plate 54 to heat the onboard battery 11. With this configuration, it is possible to effectively heat the onboard battery 11 with the heating wire 41 and the temperature control plate 54. In the temperature range in which the temperature of the onboard battery 11 is from −5° C. to 15° C., the electronic control unit 21 heats the onboard battery 11 only with the heating wire 41 and stops the temperature control plate 54. As a result, it is possible to heat, in a concentrated manner, the vehicle cabin with the fluid that has cooled the engine. In the temperature range in which the temperature of the onboard battery 11 is 15° C. or more, the onboard battery 11 is sufficiently heated. Hence, the electronic control unit 21 stops the heating operations of the heating wire 41 and the temperature control plate 54.

Next, a case where the onboard battery 11 is not charged, that is, a case where the vehicle 12 is driven by discharging the onboard battery 11 or a case where the car is left will be described. In the temperature range in which the temperature of the onboard battery 11 is from −35° C. to 25° C., the electronic control unit 21 operates neither the heating wire 41 nor the temperature control plate 54. In the temperature range in which the temperature of the onboard battery 11 is from −25° C. to 15° C., the electronic control unit 21 operates only the heating wire 41 and stops the temperature control plate 54. In this temperature range, because the temperature of the onboard battery 11 is low, the onboard battery 11 is heated with the heating wire 41 even while the vehicle 12 is driven. The reason for stopping the temperature control plate 54 in this temperature range is that thermal contact with a fluid at a temperature of about 85° C. for cooling the engine could negatively affect the lithium-ion battery. In the temperature range in which the temperature of the onboard battery 11 is from 15° C. to 35° C., the electronic control unit 21 stops the heating wire 41 and basically stops the temperature control plate 54. However, when the temperature difference among the battery cells 52 is 5° C. or more, the electronic control unit 21 causes temperature-leveling water at a temperature of about 25° C. to circulate through the interior of the temperature control plate 54. When the temperature of the onboard battery 11 is 35° C. or more, the heating wire 41 is stopped, and water at a temperature of 15° C. or less is circulated through the temperature control plate 54 to cool the onboard battery 11.

Next, the control for preventing the formation of condensation on the onboard battery 11 will be described. When the temperature of the onboard battery 11 is 15° C. or less, the condensation is unlikely to occur. Hence, the heating wire 41 is stopped. In the temperature range in which the temperature of the onboard battery 11 is from 15° C. to 40° C., when the temperature difference between the onboard battery 11 and the outside air temperature exceeds 20° C., the electronic control unit 21 operates the heating wire 41. For example, the operation of the heating wire 41 is started when the temperature of the onboard battery 11 is 7° C. or more, and the temperature difference between the onboard battery 11 and the outside air temperature exceeds 20° C. Furthermore, the maximum temperature of the onboard battery 11 is measured, and, when the maximum temperature is higher by 7° C. than the temperature at which the operation of the heating wire 41 is started, the electronic control unit 21 stops the operation of the heating wire 41. This is because the measurement errors of thermistors, serving as the temperature sensors 22, that measure the temperature of the onboard battery 11 are 2° C., and the temperature difference among the temperature control plates 54 is 5° C. When the temperature of the onboard battery 11 is 35° C. or more, the heating wire 41 is stopped.

Herein, the operation-starting temperature at which the heating wire 41 and the temperature control plate 54 start the heating operations may be set by taking into consideration the errors of the temperature sensors 22, which are thermistors. For example, when the temperatures of the battery cells 52 has decreased, and the battery cells 52 are heated from 0° C., even if the temperature measured by the temperature sensors 22 is 0° C., the actual temperature of the battery cells 52 may be 0° C. or less due to the measurement errors of the temperature sensors 22. In view of this situation, even when the battery cells 52 are heated from 0° C., considering the battery temperature characteristics, the operation-starting temperature in the actual control is set to a temperature allowing for the measurement errors of the temperature sensors 22, that is, for example, 2° C. With this configuration, it is possible to maintain the average temperature of the battery cells 52 at a temperature ensuring a certain charging/discharging performance level of the battery cells 52, for example, 0° C. or more.

Furthermore, the operation-stopping temperature at which the heating wire 41 and the temperature control plate 54 stop the heating operations may be set by allowing for the errors of the temperature sensors 22, which are thermistors, and the temperature difference among the battery cells 52. For example, when the battery cells 52 are heated with the operation-stopping temperature being set to 0° C., because there are the errors (for example, 2° C.) of the temperature sensors 22 and the temperature difference (for example, 5° C.) between the battery cells 52, if the heating wire 41 and the temperature control plate 54 stop operations when the temperature measured by the temperature sensors 22 is 0° C., heating is stopped even though there may be a battery cell 52 having a temperature of −7° C. This leads to a problem in that the battery cells 52 are not sufficiently heated. Hence, by setting the operation-stopping temperature to 7° C. by allowing for the errors of the temperature sensors 22 and the temperature difference among the battery cells 52, it is possible to heat all the battery cells 52 to 0° C. and, thus, to effectively charge and discharge the battery cells 52.

Moreover, when the operation-starting temperature and the operation-stopping temperature of the heating wire 41 and the temperature control plate 54 are set by allowing for the errors of the temperature sensors 22 and the temperature difference among the battery cells 52, it is better to provide a certain difference between the operation-starting temperature and the operation-stopping temperature to prevent hunting. Because the battery cells 52 have a large heat capacity, even if the battery cells 52 having a temperature of 0° C. are left under a temperature of −10° C., it takes about eight hours for the battery cells 52 to obtain a temperature change of 10° C. Hence, the difference between the operation-starting temperature and the operation-stopping temperature does not need to be so large.

Although the embodiment of the disclosure has been described above, the disclosure is not limited thereto and may be modified within a scope not departing from the spirit of the disclosure. The above-described features may be combined to one another.

The disclosure provides an onboard-battery temperature controller disposed inside a vehicle, near a battery including a plurality of battery cells, and configured to control the temperature of the battery cells. The onboard-battery temperature controller includes: a fluid heater configured to heat the battery cells through heat exchange between a heating fluid circulating therein and the battery cells; a heat generating body configured to be energized and generate heat, the heat being conducted to the battery cells to heat the battery cells; and an arithmetic and control unit configured to control operations of the fluid heater and the heat generating body on the basis of the temperature of the battery. With this configuration, in the onboard-battery temperature controller according to an embodiment of the disclosure, by controlling the operations of the fluid heater and the heat generating body on the basis of the battery temperature, it is possible to quickly heat the battery with the fluid heater and to reduce the power consumption with the heat generating body.

Furthermore, in the onboard-battery temperature controller according to an embodiment of the disclosure, the arithmetic and control unit is configured to heat the battery cells with the heat generating body when the battery is not charged. With this configuration, in the onboard-battery temperature controller according to an embodiment of the disclosure, by heating the battery with the heat generating body, which has a low power consumption, when the battery is not charged, excessive exhaustion of the battery is suppressed.

Furthermore, in the onboard-battery temperature controller according to an embodiment of the disclosure, the arithmetic and control unit is configured to heat the battery with the fluid heater or the heat generating body when there is a certain temperature difference between the battery and the outside. With this configuration, in the onboard-battery temperature controller according to an embodiment of the disclosure, even if there is a large temperature difference between the battery and the outside, the formation of condensation on the battery is suppressed by heating the battery.

Furthermore, in the onboard-battery temperature controller according to an embodiment of the disclosure, a fluid for cooling an engine installed in the vehicle circulates through the fluid heater. With this configuration, in the onboard-battery temperature controller according to an embodiment of the disclosure, it is possible to heat, with the fluid heater, the battery by utilizing the exhaust heat of the engine, without needing to provide a dedicated heating unit.

Furthermore, in the onboard-battery temperature controller according to an embodiment of the disclosure, the arithmetic and control unit is configured to heat the battery only with the fluid heater and not to operate a vehicle-cabin air-conditioner when the battery is charged. With this configuration, in the onboard-battery temperature controller according to an embodiment of the disclosure, it is possible to quickly heat the battery with the fluid heater by using a current supplied when the battery is charged. By not operating the vehicle-cabin air-conditioner, it is possible to supply, to the fluid heater, a heating fluid having a temperature suitable for heating the battery, instead of circulating, through the fluid heater, a high-temperature fluid of about 80° C. for the vehicle-cabin air-conditioner.

Furthermore, in the onboard-battery temperature controller according to an embodiment of the disclosure, the arithmetic and control unit is configured to heat the battery with both the heat generating body and the fluid heater when the battery is charged, the vehicle-cabin air-conditioner is operated, and the battery temperature is in a temperature range in which the output of the battery is restricted. With this configuration, in the onboard-battery temperature controller according to an embodiment of the disclosure, it is possible to effectively heat the battery with both the heat generating body and the heater.

Furthermore, in the onboard-battery temperature controller according to an embodiment of the disclosure, the arithmetic and control unit is configured to heat the battery only with the heat generating body when the battery is charged, the vehicle-cabin air-conditioner is operated, and the battery temperature is in a temperature range in which the output of the battery is not restricted. With this configuration, in the onboard-battery temperature controller according to an embodiment of the disclosure, it is possible to supply the heating fluid only to the vehicle-cabin air-conditioner, thus effectively warming the vehicle cabin, while continuing heating of the battery with the heat generating body.

Furthermore, in the onboard-battery temperature controller according to an embodiment of the disclosure, the fluid heater is a temperature control plate disposed immediately below the battery cells. With this configuration, in the onboard-battery temperature controller according to an embodiment of the disclosure, it is possible to effectively heat the battery cells with the heating fluid circulating through the temperature control plate.

Furthermore, in the onboard-battery temperature controller according to an embodiment of the disclosure, the battery includes a plurality of batteries, and the heat generating body is a heating wire disposed in a sheet-like form in a space between the batteries. With this configuration, in the onboard-battery temperature controller according to an embodiment of the disclosure, it is possible to effectively heat the battery with the sheet-like heating wire.

The invention claimed is:

1. An onboard-battery temperature controller to be disposed inside a vehicle, an onboard-battery temperature controller being configured to control a temperature of a battery cells which comprise a battery, the onboard-battery temperature controller comprising:
   a fluid heater configured to heat the battery cells through heat exchange between a heating fluid circulating therein and the battery cells;
   a heat generating body configured to be energized and generate heat to be conducted to the battery cells to heat the battery cells; and
   an arithmetic and control unit programmed to perform a heating operation for heating the battery cells by controlling the fluid heater and the heat generating body, when a temperature of the battery is equal to or less than a first predetermined temperature,
   wherein the arithmetic and control unit, in a case of performing the heating operation, is programmed to:
   control the fluid heater and the heat generating body based on the temperature of the battery, a state of the battery and a state of a vehicle-cabin air-conditioner, the state of the battery indicates whether the battery is in charging or not, and the state of the vehicle-cabin air-conditioner indicates whether the vehicle-cabin air-conditioner is in operation or not;
   activate both the fluid heater and the heat generating body when the temperature of the battery is equal to or less than a second predetermined temperature that is less than the first predetermined temperature, the battery is in charging and the vehicle-cabin air conditioner is in operation; and
   deactivate the fluid heater and activate the heat generating body when the temperature of the battery is more than the second predetermined temperature, the battery is in charging and the vehicle-cabin air conditioner is in operation.

2. The onboard-battery temperature controller according to claim 1, wherein the arithmetic and control unit is programmed to heat the battery with the fluid heater or the heat generating body when the temperature of the battery is more than the first predetermined temperature and there is a certain temperature difference between the battery and the outside.

3. The onboard-battery temperature controller according to claim 1, wherein a fluid for cooling an engine installed in the vehicle is to circulate through the fluid heater.

4. The onboard-battery temperature controller according to claim 1, wherein the fluid heater is a temperature control plate disposed immediately below the battery cells.

5. The onboard-battery temperature controller according to claim 1, wherein
the battery comprises a plurality of batteries, and
the heat generating body is a heating wire disposed in a sheet form in a space between the batteries.

6. The onboard-battery temperature controller according to claim 1, wherein the arithmetic and control unit, in a case of performing the heating operation, is further programmed to activate the fluid heater and deactivate the heat generating body when the battery is in charging and the vehicle-cabin air-conditioner is not in operation.

7. The onboard-battery temperature controller according to claim 1, wherein the arithmetic and control unit, in a case of performing the heating operation, is further programmed to deactivate the fluid heater and activate the heat generating body when the battery is not in charging.

8. The onboard-battery temperature controller according to claim 6, wherein the arithmetic and control unit, in a case of performing the heating operation, is further programmed to deactivate the fluid heater and activate the heat generating body when the battery is not in charging.

9. The onboard-battery temperature controller according to claim 6, wherein the arithmetic and control unit is programmed to heat the battery with the fluid heater or the heat generating body when the temperature of the battery is more than the first predetermined temperature and there is a certain temperature difference between the battery and the outside.

10. The onboard-battery temperature controller according to claim 7, wherein the arithmetic and control unit is programmed to heat the battery with the fluid heater or the heat generating body when the temperature of the battery is more than the first predetermined temperature and there is a certain temperature difference between the battery and the outside.

11. The onboard-battery temperature controller according to claim 8, wherein the arithmetic and control unit is programmed to heat the battery with the fluid heater or the heat generating body when the temperature of the battery is more than the first predetermined temperature and there is a certain temperature difference between the battery and the outside.

12. The onboard-battery temperature controller according to claim 8, wherein the second predetermined temperature is an upper limit of a temperature range where an output of the battery is restricted due to low temperature.

13. The onboard-battery temperature controller according to claim 11, wherein the second predetermined temperature is an upper limit of a temperature range where an output of the battery is restricted due to low temperature.

* * * * *